US010117078B1

(12) United States Patent
Mendelson

(10) Patent No.: US 10,117,078 B1
(45) Date of Patent: Oct. 30, 2018

(54) MEDICAL INFORMATION COMMUNICATION METHOD

(71) Applicant: Ehud Mendelson, Coral Springs, FL (US)

(72) Inventor: Ehud Mendelson, Coral Springs, FL (US)

(*) Notice: Subject to any disclaimer, the term of this patent is extended or adjusted under 35 U.S.C. 154(b) by 0 days.

(21) Appl. No.: 15/972,074

(22) Filed: May 4, 2018

Related U.S. Application Data

(62) Division of application No. 15/953,389, filed on Apr. 13, 2018, which is a division of application No. 15/687,445, filed on Aug. 26, 2017, now Pat. No. 9,961,507, which is a division of application No. 15/403,146, filed on Jan. 10, 2017, now Pat. No. 9,772,193, which is a division of application No. 15/397,685, filed on Jan. 3, 2017, now Pat. No. 9,674,684, which is a division of application No. 15/237,727, filed on Aug. 16, 2016, now Pat. No. 9,538,332, which is a division of application No. 15/086,028, filed on Mar. 30, 2016, now Pat. No. 9,420,423, which is a division of application No. 14/285,406, filed on May 22, 2014, now Pat. No. 9,602,193, which is a division of application No. 14/285,332, filed on May 22, 2014, now Pat. No. 9,491,584, which is a division of application No. 14/285,273, filed on May 22, 2014, now Pat. No. 9,204,257, which is a division of application No. 14/285,209, filed on May 22, 2014, now Pat. No. 9,204,251, which is a division of application No. 12/930,735, filed on Jan. 14, 2011, now Pat. No.
(Continued)

(51) Int. Cl.
H04B 7/00 (2006.01)
H04W 4/44 (2018.01)
G01S 5/02 (2010.01)
H04W 4/02 (2018.01)
H04W 4/40 (2018.01)

(52) U.S. Cl.
CPC ............. H04W 4/44 (2018.02); G01S 5/0231 (2013.01); H04W 4/023 (2013.01); H04W 4/40 (2018.02)

(58) Field of Classification Search
CPC .......... H04W 4/44; H04W 4/40; H04W 4/023
USPC ....................................... 455/41.2
See application file for complete search history.

(56) References Cited

U.S. PATENT DOCUMENTS 3,114,128 A 12/1963 Ljungman
3,130,298 A 4/1964 Schwarz
(Continued)

FOREIGN PATENT DOCUMENTS

JP 9126804 A 5/1997

Primary Examiner — April G Gonzales
(74) Attorney, Agent, or Firm — Allen D. Hertz, P.A.; Allen D. Hertz

(57) ABSTRACT

A method of storing and utilizing a user's cellular telephone to securely store a user's identification and associated medical information to be use in an emergency and in a non-emergency condition. The medical information can be accessed by medical providers or emergency personnel. An application operating on the cellular telephone can provide a link to the emergency personnel and medical providers. The medical information can be broadcasted in an identification portion of a Wi-Fi or Bluetooth protocol transmission. The process is capable of being accomplished using a one-way transmission.

26 Claims, 6 Drawing Sheets

Related U.S. Application Data 9,020,687, which is a division of application No. 11/396,843, filed on Apr. 3, 2006, now Pat. No. 7,899,583, said application No. 14/285,209 is a division of application No. 13/135,421, filed on Jul. 5, 2011, now Pat. No. 9,374,673, which is a division of application No. 12/932,811, filed on Mar. 7, 2011, now Pat. No. 8,941,485, which is a division of application No. 12/069,899, filed on Feb. 13, 2008, now Pat. No. 7,924,149, which is a division of application No. 11/472,706, filed on Jun. 22, 2006, now Pat. No. 8,896,485, which is a division of application No. 11/429,864, filed on May 8, 2006, now Pat. No. 8,836,580, said application No. 14/285,209 is a division of application No. 12/587,042, filed on Oct. 1, 2009, now Pat. No. 8,866,876, which is a division of application No. 11/429,864, filed on May 8, 2006, now Pat. No. 8,836,580.

(60) Provisional application No. 60/670,097, filed on Apr. 12, 2005, provisional application No. 60/678,947, filed on May 9, 2005.

(56) References Cited

U.S. PATENT DOCUMENTS

| | | |
|---|---|---|
| 3,158,836 A | 11/1964 | McCauley |
| 3,166,732 A | 1/1965 | Ljungman |
| 3,867,615 A | 2/1975 | Sioufi |
| 4,491,970 A | 1/1985 | LaWhite et al. |
| 5,195,126 A | 3/1993 | Carrier et al. |
| 5,250,955 A | 10/1993 | Major |
| 5,272,483 A | 12/1993 | Kato |
| 5,293,163 A | 3/1994 | Kakihara |
| 5,305,370 A | 4/1994 | Kearns et al. |
| 5,319,363 A | 6/1994 | Welch et al. |
| 5,383,127 A | 1/1995 | Shibata |
| 5,416,712 A | 5/1995 | Geier |
| 5,432,508 A | 7/1995 | Jackson |
| 5,442,348 A | 8/1995 | Mushell |
| 5,454,461 A | 10/1995 | Jacobs |
| 5,485,520 A | 1/1996 | Chaum et al. |
| 5,504,482 A | 4/1996 | Schreder |
| 5,568,535 A | 10/1996 | Sheffer et al. |
| 5,606,506 A | 2/1997 | Kyrtsos |
| 5,638,279 A | 6/1997 | Kishi et al. |
| 5,652,570 A | 7/1997 | Lepkofker |
| 5,712,619 A | 1/1998 | Simkin et al. |
| 5,742,233 A | 4/1998 | Hoffman et al. |
| 5,771,001 A | 6/1998 | Cobb |
| 5,798,733 A | 8/1998 | Ethridge |
| 5,838,237 A | 11/1998 | Revell et al. |
| 5,873,040 A | 2/1999 | Dunn et al. |
| 5,910,782 A | 6/1999 | Schmitt et al. |
| 5,929,777 A | 7/1999 | Reynolds |
| 5,940,481 A | 8/1999 | Zeitman |
| 5,971,921 A | 10/1999 | Timbel |
| 5,995,040 A | 11/1999 | Issler et al. |
| 6,028,537 A | 2/2000 | Suman et al. |
| 6,072,396 A | 6/2000 | Gaukel |
| 6,340,928 B1 | 1/2002 | McCurdy |
| 6,445,937 B1 | 9/2002 | daSilva |
| 6,535,127 B1 | 3/2003 | Taylor |
| 6,636,732 B1 | 10/2003 | Boling et al. |
| 6,738,628 B1 | 5/2004 | McCall et al. |
| 6,807,564 B1 | 10/2004 | Zellner et al. |
| 6,970,101 B1 | 11/2005 | Squire et al. |
| 7,026,954 B2 | 4/2006 | Slemmer et al. |
| 7,031,875 B2 | 4/2006 | Ellenby et al. |
| 7,034,678 B2 | 4/2006 | Burkley et al. |
| 7,072,666 B1 | 7/2006 | Kullman |
| 7,245,216 B2 | 7/2007 | Burkley et al. |
| 7,483,917 B2 | 1/2009 | Sullivan et al. |
| 7,743,337 B1 | 6/2010 | Maeda et al. |
| 7,907,931 B2 | 3/2011 | Hartigan et al. |
| 7,933,395 B1 | 4/2011 | Bailly et al. |
| 8,041,330 B1 | 10/2011 | Garin |
| 8,126,960 B2 | 2/2012 | Obradovich et al. |
| 8,705,527 B1 * | 4/2014 | Addepalli ............ H04W 4/046 370/389 |
| 8,770,477 B2 * | 7/2014 | Hefetz ................. G06Q 20/32 235/380 |
| 8,896,485 B2 * | 11/2014 | Mendelson .......... G01C 21/206 342/463 |
| 9,204,251 B1 * | 12/2015 | Mendelson ............. G08G 1/14 |
| 9,392,406 B2 * | 7/2016 | Houri .................... G01S 5/0252 |
| 9,538,332 B1 * | 1/2017 | Mendelson ............. H04W 4/90 |
| 9,553,626 B2 * | 1/2017 | Callaway, Jr. .... H04W 52/0261 |
| 2001/0026223 A1 | 10/2001 | Menard et al. |
| 2002/0075941 A1 | 6/2002 | Souissi |
| 2002/0129138 A1 | 9/2002 | Carter |
| 2002/0131386 A1 | 9/2002 | Gwon |
| 2003/0018708 A1 | 1/2003 | Hlasny |
| 2003/0034881 A1 | 2/2003 | Linnett et al. |
| 2003/0045280 A1 | 3/2003 | Simons |
| 2003/0050039 A1 | 3/2003 | Baba et al. |
| 2003/0067392 A1 | 4/2003 | Monroe |
| 2003/0087628 A1 | 5/2003 | Michibata |
| 2003/0148771 A1 | 8/2003 | de Verteuil |
| 2004/0066917 A1 | 4/2004 | Yasukawa et al. |
| 2004/0068433 A1 | 4/2004 | Chatterjee |
| 2004/0072583 A1 | 4/2004 | Weng |
| 2004/0239498 A1 | 12/2004 | Miller |
| 2005/0021369 A1 | 1/2005 | Cohen et al. |
| 2005/0070315 A1 | 3/2005 | Rai et al. |
| 2005/0096070 A1 | 5/2005 | Kanevsky et al. |
| 2005/0111630 A1 | 5/2005 | Potorny et al. |
| 2005/0187819 A1 | 8/2005 | Johnson |
| 2005/0221858 A1 | 10/2005 | Hoddie |
| 2006/0003775 A1 * | 1/2006 | Bull ..................... G01S 5/0205 455/456.1 |
| 2006/0033641 A1 | 2/2006 | Jaupitre et al. |
| 2006/0095331 A1 | 5/2006 | O'Malley et al. |
| 2006/0122767 A1 | 6/2006 | Athalye |
| 2006/0163349 A1 | 7/2006 | Neugebauer |
| 2006/0199196 A1 * | 9/2006 | O'Banion ............. B01L 3/545 435/6.16 |
| 2006/0253226 A1 | 11/2006 | Mendelson |
| 2007/0032225 A1 | 2/2007 | Konicek et al. |
| 2008/0227473 A1 | 9/2008 | Haney |
| 2008/0280624 A1 | 11/2008 | Wrappe |
| 2009/0006418 A1 | 1/2009 | O'Malley |
| 2010/0120447 A1 * | 5/2010 | Anderson ............ H04W 64/003 455/456.1 |
| 2010/0142402 A1 | 6/2010 | Boldyrev |
| 2012/0023171 A1 * | 1/2012 | Redmond ............. H04M 1/7253 709/205 |
| 2012/0084364 A1 * | 4/2012 | Sivavakeesar ...... H04L 12/1818 709/205 |
| 2012/0188101 A1 * | 7/2012 | Ganot ................... G07B 15/02 340/932.2 |
| 2012/0264447 A1 * | 10/2012 | Rieger, III ............ G01S 5/0252 455/456.1 |
| 2013/0113936 A1 * | 5/2013 | Cohen ................... G07B 15/02 348/148 |

* cited by examiner

MEDICAL INFORMATION COMMUNICATION METHOD

CROSS REFERENCE TO RELATED APPLICATIONS

This application is:

A) is a Divisional Application of copending U.S. patent application Ser. No. 15/953,389 filed on Apr. 13, 2018,
   wherein U.S. patent application Ser. No. 15/953,389 is a Divisional Application of U.S. patent application Ser. No. 15/687,445 filed on Aug. 26, 2017 (now U.S. Pat. No. 9,674,684, issued on May 1, 2018),
   wherein U.S. patent application Ser. No. 15/687,445 is a Divisional Application of U.S. patent application Ser. No. 15/403,146 filed on Jan. 10, 2017 (now U.S. Pat. No. 9,772,193, issued on Sep. 26, 2017),
   wherein U.S. patent application Ser. No. 15/403,146 is a Divisional Application of U.S. patent application Ser. No. 15/397,685 filed on Jan. 3, 2017 (now U.S. Pat. No. 9,674,684, issued on Jun. 6, 2017),
   wherein U.S. patent application Ser. No. 15/397,685 is a Divisional Application of U.S. patent application Ser. No. 15/237,727 filed on Aug. 16, 2016 (now U.S. Pat. No. 9,538,332, issued on Jan. 3, 2017),
   wherein U.S. patent application Ser. No. 15/237,727 is a Divisional Application of U.S. patent application Ser. No. 15/086,028 filed on Mar. 30, 2016 (now U.S. Pat. No. 9,420,423, issued on Aug. 16, 2016),
   wherein U.S. patent application Ser. No. 15/086,028 is a Divisional Application of U.S. patent application Ser. No. 14/285,406 filed on May 22, 2014 (now U.S. Pat. No. 9,602,193, issued on Mar. 21, 2017),
   wherein U.S. patent application Ser. No. 14/285,406 is a Divisional Application of U.S. patent application Ser. No. 14/285,332 filed on May 22, 2014 (now U.S. Pat. No. 9,491,584, issued on Nov. 8, 2016),
   wherein U.S. patent application Ser. No. 14/285,332 is a Divisional Application of U.S. patent application Ser. No. 14/285,273 filed on May 22, 2014, (now U.S. Pat. No. 9,204,257, issued on Dec. 1, 2015),
   wherein U.S. patent application Ser. No. 14/285,273 is a Divisional Application of U.S. patent application Ser. No. 14/285,209 filed on May 22, 2014, (now U.S. Pat. No. 9,204,251, issued on Dec. 1, 2015),
   wherein U.S. patent application Ser. No. 14/285,209 is a Divisional Application of U.S. patent application Ser. No. 12/930,735 filed on Jan. 14, 2011 (now U.S. Pat. No. 9,020,687, issued on Apr. 28, 2015),
   wherein U.S. patent application Ser. No. 12/930,735 is a Divisional Application of U.S. patent application Ser. No. 11/396,843 filed on Apr. 3, 2006 (now U.S. Pat. No. 7,899,583, issued on Mar. 1, 2011),
   wherein U.S. patent application Ser. No. 11/396,843 is a Non-Provisional U.S. Patent Application claiming the benefit of U.S. Provisional Patent Application Ser. No. 60/670,097 filed on Apr. 12, 2005;

B) wherein U.S. patent application Ser. No. 14/285,209 is a Divisional Application of U.S. patent application Ser. No. 13/135,421 filed on Jul. 5, 2011 (now U.S. Pat. No. 9,374,673, issued on Jun. 21, 2016),
   wherein U.S. patent application Ser. No. 13/135,421 is a Divisional Application of U.S. patent application Ser. No. 12/932,811 filed on Mar. 7, 2011 (now U.S. Pat. No. 8,941,485, issued on Jan. 27, 2015),
   wherein U.S. patent application Ser. No. 12/932,811 is a Divisional Application of U.S. patent application Ser. No. 12/069,899 filed on Feb. 13, 2008 (issued as U.S. Pat. No. 7,924,149, issued on Apr. 12, 2011),
   wherein U.S. patent application Ser. No. 12/069,899 is a Divisional Application of U.S. patent application Ser. No. 11/472,706 filed on Jun. 22, 2006 (now U.S. Pat. No. 8,896,485, issued on Nov. 25, 2014),
   wherein U.S. patent application Ser. No. 11/472,706 is a Divisional Application of U.S. patent application Ser. No. 11/429,864 filed on May 8, 2006 (now U.S. Pat. No. 8,836,580, issued on Sep. 16, 2014),
   wherein U.S. patent application Ser. No. 11/429,864 is a Non-Provisional U.S. Patent Application claiming the benefit of U.S. Provisional Patent Application Ser. No. 60/678,947 filed on May 9, 2005, and C) wherein U.S. patent application Ser. No. 14/285,209 is a Divisional Application of U.S. patent application Ser. No. 12/587,042 filed on Oct. 1, 2009 (now U.S. Pat. No. 8,866,876, issued on Oct. 21, 2014),
   wherein U.S. patent application Ser. No. 12/587,042 is a Divisional Application of U.S. patent application Ser. No. 11/429,864 filed on May 8, 2006 (now U.S. Pat. No. 8,836,580, issued on Sep. 16, 2014),
   wherein U.S. patent application Ser. No. 11/429,864 is a Non-Provisional U.S. Patent Application claiming the benefit of U.S. Provisional Patent Application Ser. No. 60/678,947 filed on May 9, 2005.

SPECIFICATION AND DRAWINGS

This application replicates and presents claims that rely upon the Specification and drawings of U.S. patent application Ser. No. 13/135,421 filed on Jul. 5, 2011 (now U.S. Pat. No. 9,374,673 B2 on Jun. 21, 2016).

FIELD OF THE INVENTION

This invention is directed generally to the field of medical information, rescue and emergency and, more particularly, to methods used indoors and/or outdoors in cases of emergencies, where a user's medical information is conveyed to emergency personnel or medical service providers.

BACKGROUND OF THE INVENTION

The present invention enhances the capability of research and rescue personnel to search/scan a disaster or emergency area for people that may be trapped and looking for help by scanning and locating the most likely device that they all carry a cellular or mobile telephone. The disclosed system intends to be used in an environment that is potentially much less "friendly" than normal and more demanding as proof over and over in most emergency situations when the cellular network fail.

From the outset, the disclosed system has been designed with the capability to utilize existing technology so it can be deployed as a stand-alone system, or in tandem with existing systems. The disclosed system focuses on technology already in place that simply needs to be expanded.

It is believed that implementation of the disclosed system will assist search and rescue teams as well as counter terrorism activities and more importantly will provide additional tools that may help the first response teams to search and rescue people trapped inside buildings or in an emergency disaster area especially when you need to pin point and locate the people where the cellular infrastructure fails, the disclosed system can save lives.

One fact is that cellular or mobile telephones are the most carried electronics devices. At the time this specification was originally drafted, it is estimated that soon there would be more cellular or mobile telephones than people in the world and most people carry mobile cell phones all the time.

Although there has been much effort by cellular companies after Sep. 11, 2001 (9/11), tracing for people calling E-911 from cell phone results in an accuracy of 300-1000 meters and fails the requirement set by the FCC, and that is only when the infrastructure and the cellular communication are still in working order.

During recent emergencies including Sep. 11, 2001 (9/11) the cellular telephone network went down and many cellular or mobile telephone calls and messages could not go through because of the huge demand. This is common in most emergency or disaster situations and is further aggravated when the cellular communication failure or damage.

It is widely estimated that many people survive catastrophic disasters like recent earthquakes and terrorist events such as Sep. 11, 2001 (9/11) but remain trapped inside the rubble without any ability to communicate or use their cellular or mobile telephones to call for rescue.

Wake-Up Calls:

The Sep. 11, 2001 (9/11) terrorist attacks on the World Trade Center and the Pentagon, the Madrid bombings, the London bombings, the New York subway failure, the Virginia Tech shootings, recent earthquakes, and tornado disasters demonstrated the weaknesses and failures of the existing cellular communications infrastructure, especially when a person needs it most.

On Sep. 11, 2001 (9/11), radio transmitters and cell sites including telecommunications infrastructure were damaged. Emergency personnel could not communicate within these challenging environmental conditions. There were tremendous gaps in command and control. Firefighters were cut off from critical communication because their radio systems failed. Many lives were lost including those who were still alive, but couldn't be found in time.

"When the towers went down the cell sites were lost, as cell sites dropped, so did the communications."

—Former NYC Police Commissioner quote.

The existing technical means to detect where mobile handsets are located are dependent upon cellular towers and/or a Global Positioning System (GPS) and active communication that again prove to be non-effective due to an overload of capacity (network congestion) and/or damage to the infrastructure during an emergency condition.

And more, during the emergency and immediately after the emergency, even if the cellular network still works, a network congestion is likely to occur in many types of networks. In the aftermath of the emergency the elements of real-time and location may be crucial and the cellular or mobile telephone can become useless when the telecommunications infrastructure is damaged.

Cell Phone Jamming:

Cell phone jamming devices were originally developed for law enforcement and the military to interrupt communications by criminals and terrorists that may rely on cell phones to trigger explosives. It has been widely reported that cell-phone jammers are in use by law enforcements in emergency events made by man to temporarily cease operation of the cellular communication that the terrorist or criminals may be using.

So even if the cellular communication network survives a man made emergency event, the cellular communication network most likely will still be useless due to network congestion.

And the most likely a reason there is no effective and practical solution is also:

The important of power, more specifically, the battery power.

Battery Life is so important, especially in an emergency. Hence, in a situation where a cellular or mobile telephone can't find a good network signal, or worse, any network signal, the cellular or mobile telephone will constantly search for a network signal. This continuous searching will quickly drain the battery power. This is easily understood by a user of a cellular telephone if the user has ever forgotten to turn off the cellular functions of their cellular telephone during a flight.

Common wisdom says the best way to save battery life is to turn off the features you don't really need. In an emergency, the battery can be a life saver if you can save it, but it may be absurd that the best tip you can offer to increase the cellular or mobile telephone's staying power in an emergency is to not use the cellular telephone. To be more precise, not using the cellular telephone for cellular communication.

The proposed unique approach:

The proposed unique approach is to use the cellular or mobile telephone as an emergency signalling device and not as a telephone. In an emergency, the user would initiate an application on their cellular or mobile telephone by pushing an emergency/panic/help button.

The application will allow the cellular or mobile telephone to preserve the battery by placing the cellular or mobile telephone into a beacon-like working mode to allow saving 4 to 5 times the battery power to allow the cellular or mobile telephone to be found by first responders when they will arrive to the emergency/disaster area and start the search and rescue operation. This critical time is known as a "golden day", or the time where emergency personnel generally expect to find people alive.

The disclosed innovation will allow encoding of a user's ID into the handset naming to recognize or identify the user again without the need for cellular communication.

The search and rescue team will use an emergency scanner to receive the signal from the User's cellular or mobile telephone. The emergency scanner is a sensitive power scanner designed to pick up relatively weak signals coming from a cellular or mobile telephone handset emitting at least one of a cellular signal, a Bluetooth signal, and/or a Wi-Fi signal, to pinpoint the location of the transmitting device and to enable decoding of the user's ID to identify the victim and/or trapped person.

The disclosed unique method to convert the cellular or mobile telephone into a beacon will allow the victim and/or trapped person to preserve power in the battery of the cellular or mobile telephone at least 4 to 5 times more than normal operation. The same process will allow a victim and/or trapped person to show a sign of life to emergency personnel. The same process will also provide a way to help locate the victim and/or trapped person and thus increase the "golden day" time to even days after an emergency or disaster event. In a way, without preserving power within the battery, the use of the cellular or mobile telephone would not provide a practical aid to the user.

The cellular or mobile telephone can be a life saver, even if the cellular or mobile telephone will work in a different way than the cellular or mobile telephone was designed to operate. More specifically, the application works without use of cellular communication.

The process can be an add-on tool to the first responders in any place in the world as well as an add-on tool to police or emergency units that try to locate people in case of emergency where the cellular and or the GPS are not available or not accurate.

Since, at the time this Specification was originally drafted, there are more than 4 billion cellular or mobile telephones in use all over the world, most of which include a Bluetooth communication circuit, it would be beneficial to include Bluetooth enabled cellular or mobile telephones and other Bluetooth enabled devices in public search and rescue operation systems.

Recent emergency situations teach us that the cellular communications in emergency situations are prone to crash due to the high volume of calls.

By using the disclosed method, there is no need for use of cellular communication, just the Bluetooth and/or Wi-Fi protocols included within the cellular or mobile telephone, which preserves battery power. The disclosed invention will use the signal emitted from the device (the cellular or mobile telephone) as a beacon for the user's benefit in an emergency situation.

The disclosed system uses the a communication system (Bluetooth protocols) that exists in almost all of the currently used cellular or mobile telephones. This includes even a majority of the oldest cellular or mobile telephones.

Cost: The system is not prohibitively expensive.

Deployment: The disclosed system relies on technology that is already widely available and in use today. The disclosed system can serve as add-on to the current equipment used by search and rescue units around the world. Moreover, the system can be used for other emergency situations where the user is in distress and needs to be found in the proximity of emergency personnel.

Scanning and identifying people in a proximity of emergency personnel for emergency use can be set for use in a non-emergency situation, like "a black box in a room" or only in an emergency situation.

Do to the accuracy needed and the location (can be used in an indoor environment) the Global Positioning System (GPS) can't provide a solution. Assuming a signal is available, the GPS accuracy is only 200-300'. The signals are commonly not received in an indoor environment. Therefore, a GPS based system can't accurately locate people within an indoor location.

The same is true for cellular network providers, as the accuracy is also 200-300'. It is noted that the process would require a cellular signal to be available. The cellular communication network could be a problem when a user needs it most: in an emergency situation when a significant portion of the cellular communication network could fail do to a high demand for bandwidth, damage to the infrastructure, or a combination of both.

By calculating a location of the signals (triangulation method is one of them) being transmitted from the user's cellular or mobile telephone, the searching party can achieve greater accuracy of the location of the transmitting device, which can have an accuracy that is within 10 meters.

The system can be an add-on to the E-911 and when you need to locate people in an emergency scenario in a close proximity area or when GPS and the cellular communication system can't provide the accuracy that is needed to locate the user's cellular or mobile telephone.

The cellular or mobile telephone was explored and considered for its capability to be used in an emergency. One of the options is to add to the cellular or mobile telephone a function having the ability to generate a high frequency sound, such as a "dog whispering sound" that can be detected by and alert a search and rescue dog's sensitive ears. The proposed device can sometimes be referred to as "Scanning4life". The proposed device can provide additional possibilities to find a trapped and/or injured victim. The high frequency sound could be included in the emergency application initiated by the emergency button.

Reference to Known Prior Art:

U.S. Pat. No. 6,807,564, entitled "Panic Button IP Device", describes a device for requesting emergency assistance having a built-in panic button that may be implemented in hardware or software. The device may be in a wearable configuration so that the user in need of emergency help can carry the device on the user's person, or the device may be located at a fixed location accessible by the user. Activation of the panic button by the user results in the device automatically transmitting one or more TCP/IP messages over the Internet (e.g., via Internet e-mail), with the device (and, hence, with the user) prior to dispatching emergency help. The resources of the Internet may thus be advantageously harnessed to allow users to request emergency help.

Clearly an Internet and cellular communication network must exist. As discussed above, in an emergency, Internet access and the cellular communication network is not a reliable resource and may not be working, so it is not a practical solution. Relying on Internet access and the cellular communication network is not a reliable answer. And relying on Internet access and the cellular communication network is certainly not a requirement for operation of the disclosed innovation.

U.S. Pat. No. 6,636,732, entitled "Emergency Phone With Single-Button Activation", describes an emergency-use-only cellular phone provides for contacting and establishing full duplex voice communication with emergency personnel at an emergency response center with the press of a single activation button. When the activation button is pressed a first time, the following functions are initiated:

(1) electrical power from a power supply is provided to a cellular transmitter and receiver,
(2) the cellular receiver is activated to search for an available channel from among A or B cellular system channels,
(3) an emergency telephone number is accessed from memory, and
(4) the cellular transmitter is activated to establish communication with the emergency response center.

Since all of these functions need a cellular communication network to be available it is not a practical solution.

U.S. Pat. No. 6,535,127, entitled "Panic Alert for Cellular Telephone," describes an integrated electronic apparatus including a personnel electronic device other than a personnel alarm. A personnel alarm is integrated with the personnel electronic device. A battery is electrically coupled to the personnel electronic device and the personnel alarm so as to provide electric power to both the personnel electronic device and the personnel alarm.

Clearly this is an additional device add-on that would be in addition to the cellular or mobile telephone and still requires a cellular or other communication infrastructure to be available and functional.

U.S. Pat. No. 6,340,928, entitled "Emergency Assistance System Using Bluetooth Technology", discloses "an emergency assistance system (10) that transmits vehicle and occupant information to an emergency station (26) in the event of a vehicle crash condition. The system (10) includes a vehicle crash sensing system (40) that senses the vehicle crash condition and transmits a crash signal through a first port (42) using Bluetooth technology. A cellular phone (12)

having GPS (30) receives the crash signal through a second port (32) using Bluetooth™ technology, which in turn is coupled to a controller (16) within the cellular phone (12)."

Clearly the above described emergency assistance system is used during a car crash and mandates a functional cellular telephone communication network. The Bluetooth portion of the system provides an interface between the cellular or mobile telephone and the other device, not as the disclosed innovation when the disclosed invention uses the signal as a beacon and not to establish real communication or to transfer data, clearly not as the disclosed innovation.

United States Patent Application Publication number 2001/0026223, entitled "Assisted Personnel Communication System and Method", discloses a personnel communications system which may be used for a variety of emergency and non-emergency situations using two-way communication devices and a bidirectional communication network. In one application two-way pagers are adapted for use in the system. In one application, cellular enabled devices are adapted for use in the system. In another application, an assisted living response center is established using various embodiments of the present personnel communications system. The system provides multiple levels of prioritization. One embodiment provides a method for receiving, evaluating and responding to calls received from a subscriber.

Clearly cellular or two ways communication needs to be establishing, not as the disclosed innovation.

U.S. Pat. No. 6,072,396, entitled "Apparatus and Method for Continuous Electronic Monitoring and Tracking of Individuals" discloses an apparatus and method of monitoring mobile objects or persons using the Global Positioning System (GPS) satellites and cellular telephone communications. The apparatus may include first and second remote units adapted to be worn on the monitored person or object. These remote units would comprise the position and data sensors as well as the transmitter device; the system is also adapted to monitor persons in hazardous environments such as radioactivity or poisonous gases or even to monitor inanimate objects such as automobiles.

Clearly additional device needed and not as to the disclosed innovation.

U.S. Pat. No. 5,971,921, entitled "Medical Alarm System and Methods", discloses several exemplary monitoring systems and methods for their use. In one exemplary method, a person is provided with a transmitter having an actuator. The actuator is operated to transmit a wireless signal of about 900 MHz the signal from the transmitter is sensed with a receiver/caller unit which sends a digital signal over a telephone line to a monitoring center.

The above cited reference is limited in that the solution requires an additional device using a 900 MHz transceiver.

U.S. Pat. No. 5,838,237, entitled "Personnel Alarm Device, A Self-Contained Personnel Alarm Device Capable of Signaling Its Location to a Remote Site Such as a Security Station", discloses a personnel alarm device which includes a housing enclosing a controller, an antenna, a cellular transmitter and a cellular receiver. The controller controls the transmitter and the receiver to receive position location signals such as Global Positioning System (GPS) signals, establish a cellular connection with a remote site, and transmit device location data to the remote site on the cellular connection, wherein the device location data indicates the location of the device. The cellular connection is established via a cellular telecommunication network that includes an array of cell base stations. The GPS signals are transmitted to the device over the cellular network by providing each cell base station with a Differential Global Positioning System (DGPS) receiver. Using the DGPS receivers, the GPS signals are repeated over the cellular network.

The above cited reference is limited in that the solution requires cellular communication and would be provided as an add-on system.

U.S. Pat. No. 5,771,001, entitled "Personnel Alarm System," discloses a new personnel alarm system for detecting whether a person is in an emergency situation by measuring blood pressure, pulse and temperature, and thereafter transmitting such information and location through cellular relay stations.

The above cited reference is limited in that the solution requires cellular communication where the device would be provided as an add-on to the cellular or mobile device.

U.S. Pat. No. 5,742,233, entitled "Personnel Security and Tracking System," discloses a signaling system comprising a portable signaling unit, a remote alarm switch device, a central dispatch station, and a wireless communication system such as a cellular or telephone system, etc., and a GPS or alike system. The portable signaling unit and the remote alarm switch may be adapted to be worn at different locations on the person's body. The portable signaling unit sends a data transmission which includes its location to the central dispatch station. The portable signaling unit also has manual alarm trigger capabilities so it can be used without the remote alarm switch unit. The central dispatch station receives the data transmission and accurately displays the user's Identification (ID), stored personnel information, nature of the alarm. In addition, the location of the portable signaling unit is superimposed on a digitized map at a position corresponding to the location of the person wearing the portable signaling unit. The portable signaling unit can be remotely activated from a central dispatch station to determine and monitor the location of the portable signaling unit.

The above cited reference is limited in that the solution requires an add-on unit as well as a need to establish communication.

U.S. Pat. No. 5,712,619, entitled "Global Positioning System Personnel Alarm," discloses a new Global Positioning System Personnel Alarm for providing a personnel alarm system in the event of an assault, a power source electronically connected to the global positioning system, and a cellular phone system electronically connected to the global positioning system.

The above cited reference is limited in that the solution requires an add-on device and GPS needed, which is not practical.

U.S. Pat. No. 5,652,570, entitled "Individual Location System", discloses an interactive individual location and monitoring system includes a central monitoring system for maintaining health, location, and other data with respect to an individual. A watch unit carried by the individual receives medical and other information selected by and inputted directly from the individual. The watch unit broadcasts the medical and other information locally by radio in a region near the individual. A belt worn pod, etc.

The above cited reference is limited in that the solution requires an add-on device, belt pod to wear, which is distinct from a cellular or mobile telephone.

U.S. Pat. No. 5,568,535, entitled "Alarm System for Enclosed Area", discloses an alarm system for protecting premises comprises a fully integrated, alarm detecting cellular phone unit which is linked to various sensors in order to detect the sensor outputs. The cellular alarm unit includes, in addition to cellular phone functions, a formatter or processor for generating an emergency signal on detection of a sensor output, the emergency signal including information on the type of emergency detected. Cellular connection to a remote monitoring station. The connection is wireless at least from the premises to a local cell site. Once connection is established, the emergency signal is transmitted to the monitoring station via the local cell site.

The above cited reference is limited in that the solution requires an add-on, wearable device. The sensors and other required elements are not commonly included within a cellular or mobile telephone.

U.S. Pat. No. 5,305,370, entitled "Personnel Emergency Response Communications System," discloses a personnel emergency response system in which a hand held portable transmitter (12) activates a base unit (14) interfaced with the telephone network (16) to dial 9-1-1 and permit direct communications with the operator (18) at the public safety answering point even though the user (10) is unable to reach a telephone (36). The transmitter (12) activates the base unit (14) as well as optional remote units include speaker-phone communication capabilities which permit two-way communications between the user (10) and the 9-1-1 system operator (18)."

The above cited reference is limited in that the solution requires an add-on device and needs a communication network.

U.S. Pat. No. 5,195,126, entitled "Emergency Alert and Security Apparatus and Method", discloses a telecommunications system which includes a 911 and voice message service platform for providing such services as telephone answering, voice mail and call completion. An emergency/safety notification system is incorporated and includes a monitor/router device passively connected to the 911 trunk to detect number identification signals.

The above cited reference is limited in that the solution requires a communication network. The communication network reliability issues have been described above.

U.S. Pat. No. 4,491,970, entitled "Portable Transmitter for Emergency Alarm System Having Watertight Enclosure", discloses a small portable radio transmitter unit which can be worn on the wrist or suspended from a neck chain.

The above cited reference is limited in that the solution requires an add-on device. The described devices are described as a form factor that is not available in a cellular format at the time of the original drafting of this Specification.

U.S. Pat. No. 5,873,040, entitled "Wireless 911 Emergency Location", discloses a system arrangement and method for determining a location of a wireless mobile unit involved in a call for public emergency assistance (e.g. a "911" call). The system is cost-effective in that it makes extensive use of existing telecommunication infrastructures, and does not require either special hardware or software at either the mobile unit site or the emergency assistance center handling a call. The system features shared use of a computer and specially defined database among a plurality of mobile switching offices serving a larger plurality of mobile base stations, the latter serving an even larger plurality of antenna and transceiving sites within predefined cellular regions. Signal strength measurements at the base stations are passed through the switching offices to a shared computer.

The above cited reference is limited in that the solution requires a network of stations, computers, or mobile switches needed to operate.

Most, if not all, of the disclosed prior patents and applications rely upon a cellular communication network or other communication network to communicate with the user as a cellular telephone. The present invention uses the cellular or mobile telephone, not in a capacity as a cellular or mobile telephone, but as a device that is popular to be carried by most people wherein the user can use the device to signal existence and to be located using the signal from the cellular or mobile telephone as a beacon and not as a cellular telephone capability. It is practical to say that as of now with all of the emergency and the disasters events that effect even huge advanced technologies countries like United States (US) and recently Japan (JP), no such innovation as it is suggested herein exists in the market or is currently being used accordingly.

Any suggestion to use the cellular communication network in the events of an emergency and/or a disaster has been shown to be impractical due to battery life problems, potential for failure of the cellular communication infrastructure, limitations based upon GPS and/or Cellular communication, include text messaging. To reiterate the above, reliance on cellular communication is not practical for use in an emergency condition.

It is believed that the disclosed innovation proves to be different, and is designed for such environments and conditions where and when there is no infrastructure, no cellular infrastructure, or when the cellular infrastructure is damaged or has failed. None of the prior art identified herein tries to solve the problem from the user's stand point, battery life, and from the search and rescue stand point, more specifically, the scanning ability.

In all, the disclosed innovation proves to be unique as it takes the cellular or mobile telephone and uses it, not as a cellular or mobile telephone, and not as it was design, but using all the capability of the device to be used in an emergency condition to increase the chances to located the user in a case of an emergency and/or disaster situation where and when no other communication would be available.

The disclosed innovation is based upon the following facts:

Cellular or mobile telephones are the most carried device by any "user" globally.

GPS and the existing locating methods depend upon cellular communication, where the cellular communication network would most likely not be available during and following an emergency situation.

There is a great need for more accurate processes for determining a location of a device within an indoor environment and an outdoor environment.

GPS and cellular networks can't provide the accuracy needed. GPS has limited availability in an indoor environment and/or certain outdoor environments, particularly during and following an emergency or disaster situation.

Bluetooth is the most used communication method today, and it is integrated into almost all cellular or mobile telephones used today.

Bluetooth has a way to recognize other Bluetooth devices in the close proximity.

Most of the technology already exists.

The present disclosure is based upon direct communication between the Bluetooth beacons to the user's cellular or mobile telephone without the need of the cellular communication network or GPS. In reality, there is no real communication between a scanning device and a handset (the user's cellular or mobile telephone).

Regarding Privacy: The user is in complete control. The user must push the emergency button to initiate the emergency/help/panic button and enter into the emergency mode, which will eliminate any privacy issues, as the user asks to be located.

Options:

The application method can also be use for non-emergency where and when there needs to preserve battery power and the application will determine that signal is low or weak and will initiate the same method as in an emergency scenario. The process would most likely start by shutting off the cellular signal scanning process done by the cellular or mobile telephone, which would drain the battery faster. The process enables creation of a profile to be used to preserve battery power.

The application method on the user mobile will initiate the emergency mode when:
Signal indicators find no signal for x amount of time and/or power indicators are low, then
Shut off cellular communication or go to "airplane" mode for "x" amount of time,
Turn on communication signal (Bluetooth and/or Wi-Fi and cellular signal) for "x" amount of time, bring phone from airplane mode to "x" amount of time.
In all, placing the cellular or mobile telephone into a beacon-like operation to preserve battery power.

Make a profile, more specifically, an emergency profile, to be encoded into the Bluetooth and Wi-Fi naming packet to enable decoding of the identification or emergency profile by the scanning device.

The disclosed unique method includes the user's side mobile application designed especially for emergency situations where and when the cellular communication has failed or is damaged as well with other normal infrastructure, like electric power.

The mobile application will allow the cellular or mobile telephone to enter into a beacon-like mode to preserve the cellular or mobile telephone battery as well as encoding the user's ID into the handset naming to recognize or identify the user again without the need for cellular communication or any other communication method. The emergency scanner, a sensitive scanner, is designed to pick up relatively weak signals coming from the cellular or mobile telephone handset, either as a cellular signal, a Bluetooth signal, or a Wi-Fi signal; pinpoint to the location; and allow decoding the user's ID to identify the victim and/or trapped person.

The disclosed unique method makes the cellular or mobile telephone act as a beacon, and will allow the trapped person/victim to preserve the battery power of the cellular or mobile telephone at least 4 times compared to the normal operation. The process will allow a trapped person/victim a sign of life; and a way to be found, even a few days after an emergency/disaster event.

Location Methods:
Four types of methods are used:
Proximity Detection (PD),
Received Signal Strength (RSSI),
Time of Arrival (TOA), and
Angle of Arrival (AOA).

Triangulation: Triangulation takes PD a step further, in the sense that it is based on measuring the signal level measurements from each antenna (possibly by using a triangulation mechanism), with respect to the scanning device receiving antennas. Following that, the cellular or mobile telephone is located by using a triangulation algorithm.

Why use Bluetooth for location detection within an indoor environment?

Bluetooth has some advantages in the context of indoor location, These include:
Bluetooth uses Radio Frequency (RF) in the 2.4 GHz ISM band.
Specifically, in this frequency range, the radio waves penetrate obstacles, such as walls and human bodies.
Bluetooth is a low power technology compared to other communication methods.

In contrast to Wi-Fi, Bluetooth uses much less battery power than Wi-Fi, which can drain the battery of the cellular or mobile telephone in as little as an hour of use.

Bluetooth radio waves bounce off walls too. A staircase between stories or even a small gap between a debris will allows the signal to go up from one level to another, even in steel reinforced concrete building.

Bluetooth is a dominating technique for wireless communication; it has low power consumption, drawing only 0.3 mA in a standby mode. This enables maximum performance longevity for battery powered devices.

During pauses or at lower data rates the drain would be lower.

The first hours after the disaster or emergency events are particularly critical. Many survivors who survived the event itself were in a damaged area, but some could not receive medical treatment or be extracted out of the area of the disaster because the exact location of the survivor was unknown.

Disabling the disaster network physical infrastructure damaged due to overload on those who survived, prevented those injured in the same area not only connect with their loved ones outside the disaster area, but also with search and rescue forces found their way to care for them. In some cases potential may be extracted Corkscrew found a few dozen yards apart, but in terms of visibility and noise prevented them from noticing each other.

Beacon mode broadcasts or operates at constant time interval. The main design is to preserve battery power which would be 4-5 times longer than battery life under normal operation.

Standby Time: Standby time refers to the amount of time you can leave your fully charged cellular or mobile telephone turned on before the cellular or mobile telephone will completely discharge the batteries.

Talk Time: Talk time refers to the length of time you can talk on your cellular or mobile telephone without recharging the battery. The battery capacity of a cellular or mobile telephone is usually expressed in terms of so many minutes of talk time or so many hours of standby time. When you're talking, the phone draws additional power from the battery.

Electromagnetic Energy: Electromagnetic Energy refers to the waves of electrical and magnetic energy moving together through space. Electromagnetic Energy can also be called electromagnetic radiation.

The scanning process can also scan for the electromagnetic radiations field generated by the cellular or mobile telephone when looking to establish communication, or when you can't find the cellular tower. This would be the exact situation as in a disaster.

Sleep Mode: Sleep mode is a mode of operation that is designed to conserve battery life. This mode automatically turns off (places into a sleep condition) the cellular or mobile telephone after it has been unused for a specified period of time. The unit is reactivated when the keypad is touched.

Beacon: A beacon is an intentionally conspicuous device designed to attract attention to a specific location.

Beacons can also be combined with additional information or Identification to provide important information, such as user's ID or emergency information like blood type or medical information, when used in such fashion; the cellular or mobile telephone can save life.

In a beacon mode, the cellular or mobile telephone will transmits a periodic signal with limited information content (for example its encoding identification), on a specified radio frequency available in the cellular or mobile telephone, including: cellular protocol, a Bluetooth protocol, and a Wi-Fi protocol.

Designed to transmit as a beacon in the event of an emergency, the cellular or mobile telephone/emergency beacon would broadcast a unique identification signal that can be scanned and be decoded and aid in finding the exact location of the transmitter (the cellular or mobile telephone).

When activated by the user, the cellular or mobile telephone (placed into a beacon mode) will broadcast a signal that, when detected by special scanning4life sensitive scanner, can be used to locate the cellular or mobile telephone using triangulation. The cellular or mobile telephone (placed into a beacon mode) can instantly have a unique identity via encoding the name of the user/device or other pertinent information. Furthermore, a latest GPS position can be encoded into the beacon signal, thus providing both instantaneous identification & position. The signals from the beacons are homed by Search and Rescue (SAR) ground search parties or even from the air that in turn come to the aid of the concerned persons.

One of the options is to add to the cellular or mobile telephone/beacon the ability to generate high frequency sound that can detect and alert the search and rescue dogs and the scanning4life scanning device and provide additional possibility to find the trapped victim, the sound will be part of the emergency application initiated by the emergency button.

The application can be integrated or as add-on to the Applicants recently awarded patent referred to as Nav4emergency (U.S. Pat. No. 7,924,149, issued on Apr. 12, 2011), which is incorporated herein by reference:

"Providing emergency procedure and mapping according to user location, emergency information can reside on user mobile as a standard procedure for current occupants.

Providing digital emergency guidance . . . ."

The basic purpose of the disclosed innovation is to increase the chance and "open window" to get people rescued within the so-called "golden day" (the first 24 hours following a traumatic event) when the majority of survivors can still be saved or found alive.

Using the disclosed method to preserve battery power and beacon-like operating can increase the "Golden day" the window of opportunity to find the victims and save them, it can save lives.

SUMMARY OF THE INVENTION

In accordance with the present invention, these are the disclosed project's characteristics:

According to one aspect of the invention, the present invention provides a system and method for use in an emergency condition and/or a disaster situation where the cellular or other communication infrastructure is damaged or failed.

According to another aspect, the present invention provides a method for providing a cellular or mobile telephone user with an emergency application that can be initiated by the user. The emergency application encodes an emergency ID and additional emergency information like blood type into the cellular or mobile telephone. The emergency naming will be broadcasted by the cellular or mobile telephone via a Bluetooth signal or a Wi-Fi signal to be picked up by a search and rescue scanning4life scanner device.

According to yet another aspect, the present invention provides a method where the user, in an emergency situation, can preserve the battery life of the cellular or mobile telephone by placing the cellular or mobile telephone into a beacon-like mode. The beacon-like mode saves battery power, while increasing usage of the cellular or mobile telephone device in an emergency situation. The converted cellular or mobile telephone can save a life.

According to yet another aspect, the present invention provides a method enabling a victim within an emergency or disaster situation to increase their chance to be found alive by using the user's cellular or mobile telephone in the special emergency mode.

According to another aspect, the present invention provides a method for providing the search and rescue and other emergency personnel with an add-on tool to scan detect and locate a trapped victim or a person needing help in an emergency condition by scanning and locating the most carried-on device in the world today, the user's cellular or mobile telephone.

According to another aspect, the present invention provides a method for providing the search and rescue and other emergency personnel with the tools to ID one or more persons trapped or needing help from a distance, with the victim's emergency information detected and them located.

According to another aspect, the present invention provides a method for providing search and rescue and other emergency personnel to scan, detect, and locate one or more persons in an emergency condition without the need for functioning cellular or other communication infrastructure, under an emergency condition, it is most likely that the cellular or other communication infrastructure would be damaged or failed.

According to yet another aspect, the present invention provides a method to increase the chance and open the window to rescue people within the so-called "golden day" (the first 24 hours following a traumatic event), when the majority of survivors can still be saved or found alive.

BRIEF DESCRIPTION OF THE DRAWINGS

A better understanding of the present invention may be obtained by reference to the accompanying drawings, which should be considered in conjunction with the detailed description, all in accordance with the present invention.

Like reference numerals refer to like parts throughout the several views of the drawings.

DESCRIPTION OF THE PRESENT INVENTION

Detailed embodiments of the present invention are disclosed herein. It will be understood that the disclosed embodiments are merely exemplary of the invention that may be embodied in various and alternative forms. The figures are not necessarily to scale, and some features may be exaggerated or minimized to show details of particular embodiments, features, or elements. Specific structural and functional details, dimensions, or shapes disclosed herein are not limiting but serve as a basis for the claims and for teaching a person of ordinary skill in the art the described and claimed features of embodiments of the present invention. The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims.

Figure 1:
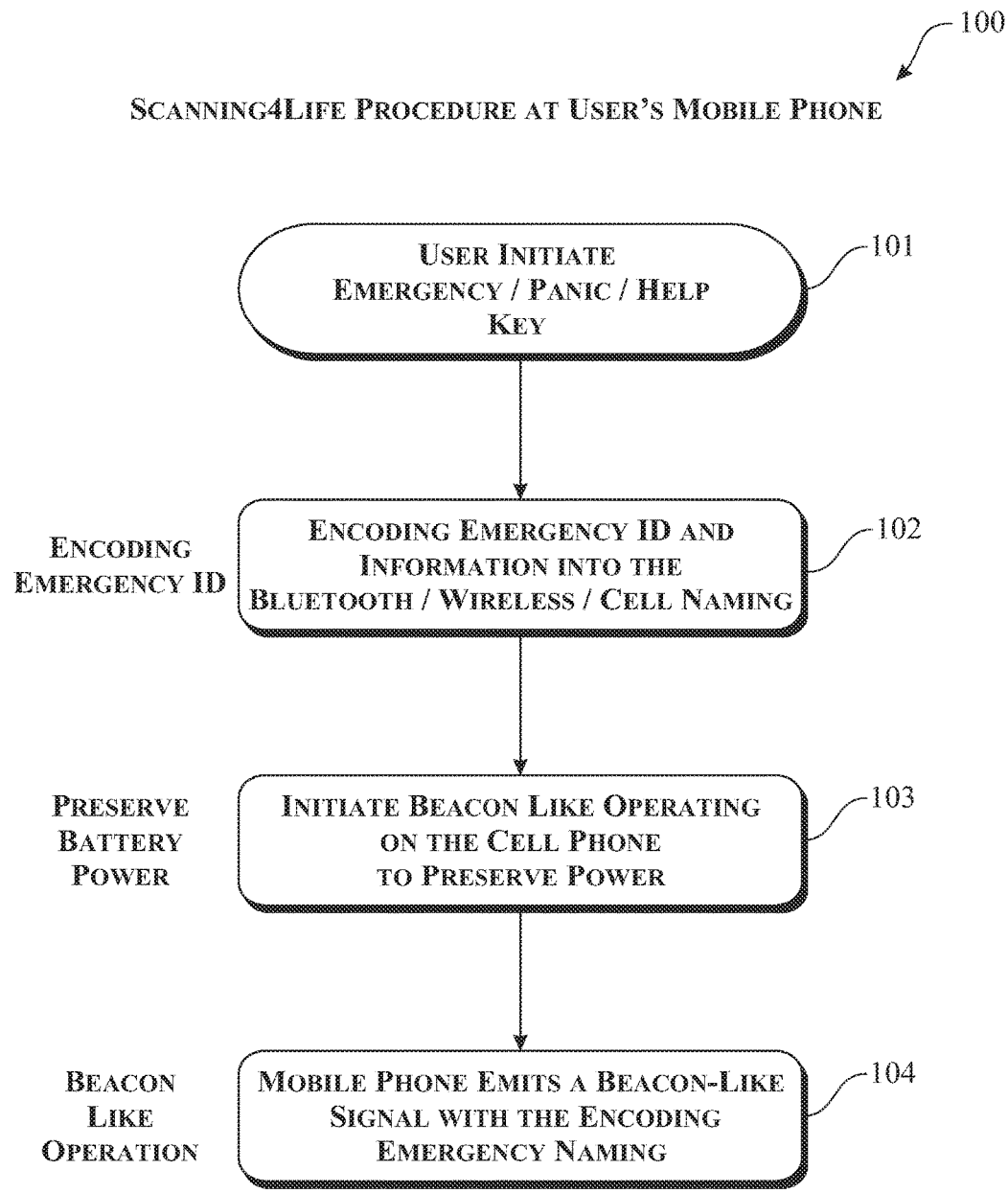
FIG. 1 presents a flow diagram of an exemplary work flow procedure at the user cellular or mobile telephone in accordance with the present invention.

For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Referring now to the drawings in detail and first particularly to FIGS. 1-6 thereof.

The presented figures illustrate a method and system to provide a first responder or an emergency team with a new method to find victims in disaster or emergency situation and the method for the mobile user to increase his chances to be found alive.

Turning to FIG. 1, the drawing illustrates a procedure associated with a scanning4life or emergency scanning and locating application on the user cellular or mobile telephone 100. The process is initiated by pressing on an emergency key icon (step 101). As part of the emergency application, an emergency ID is encoded into a naming portion of a Bluetooth signal and/or a Wi-Fi signal (step 102). The information is encoded into a code that can be recognized and decoded by a search and rescue team when undertaking an emergency condition. The encoded information can be an emergency ID (step 102). The information may also contain blood type or other important medical information that can assist the user if the user needs medical help in the emergency situation. The encoding is a done by the user when the user sets up the emergency application during an initial access on the user's cellular or mobile telephone 100. The process can use a template that will allow storing and encoding of the emergency information only when the emergency application is triggered or initiated by the user. Another component of the application is to preserve the stored power or battery life of the cellular or mobile telephone 100 by initiate a beacon-like operation (step 103), on the cellular or mobile telephone 100. Instead of operating all time the beacon mode (step 104). The application will effectively place the cellular or mobile telephone 100 into an operating condition similar to an "airplane" mode, where all possible communications will be shut down for "x" amount of time and then turn off the "airplane" mode to get the cellular or mobile telephone 100 to use the built-in Bluetooth communication, Wi-Fi communication, or cellular communication to be on for "x" amount of time and vice versa. The idea is to use the existing communication signal available on the cellular or mobile telephone 100 to aid the user in being located by a scanning4life scanning device 200 held by search and rescue unit in the emergency situation. The beacon mode (step 104), can be setup in interleave time and can be setup to include only part or few of the communication signal that can emit by the cellular or mobile telephone 100. One primary objective behind the beacon mode (step 104) is to preserve the battery life of the cellular or mobile telephone 100 in emergency environment, where and when the conditions are most likely to cause the cellular infrastructure to become damaged or fail. The result at the user's cellular or mobile telephone 100 when the cellular infrastructure is down, is an increase of the cycles where the cellular or mobile telephone 100 searches for a network signal. This increases battery consumption, thus quickly draining the battery of the cellular or mobile telephone 100. To aggravate the issue, this occurs in such time and place where it can be life saver.

Figure 2:
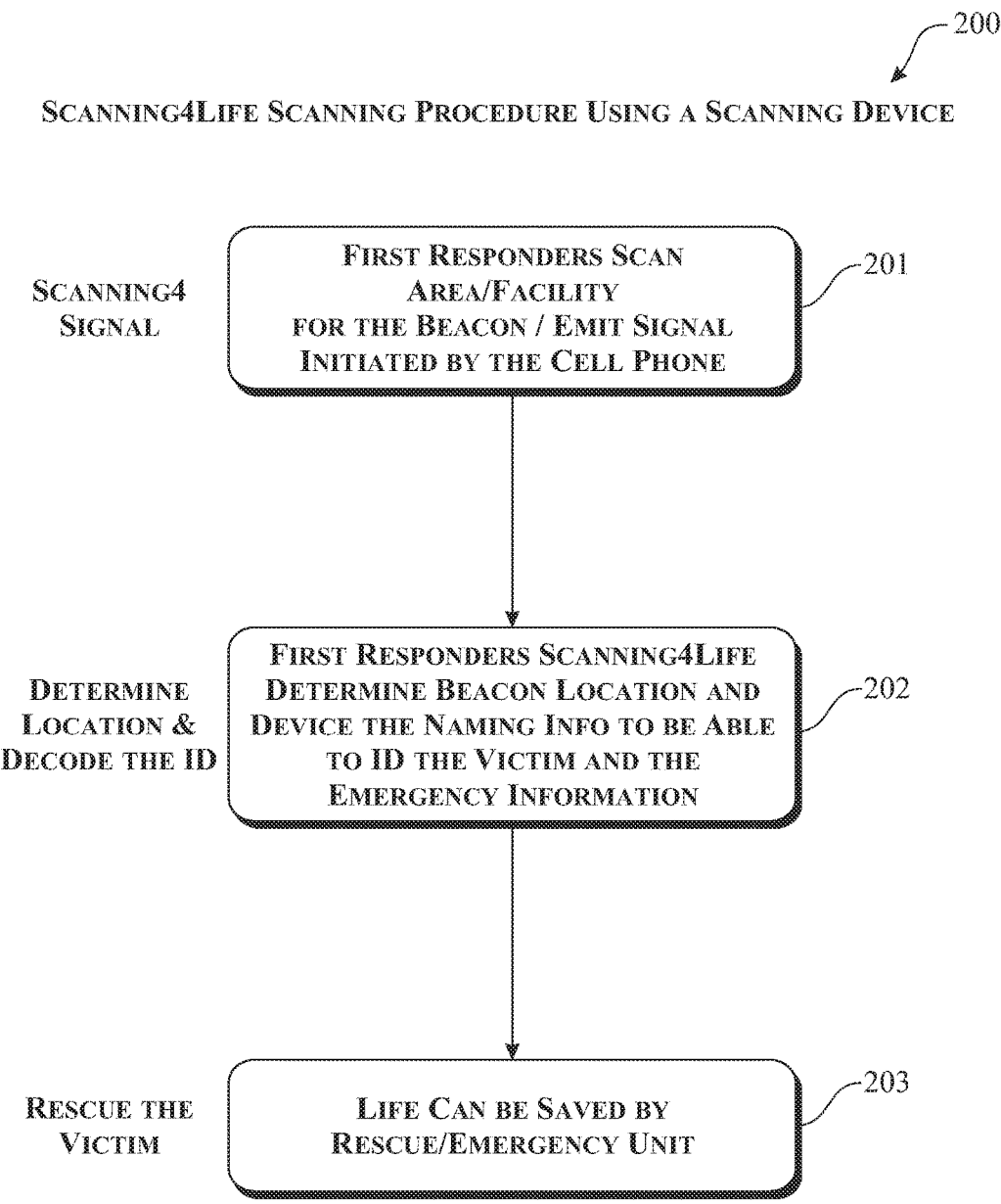
FIG. 2 presents a flow diagram illustrating steps of an exemplary detecting and locating procedure used by search and rescue or emergency personnel.

Referring to FIG. 2, the illustration presents a flow diagram detailing a scanning4life or emergency scanning and locating procedure using the scanner 200. The scanning procedure is used by emergency personnel searching to help and find the mobile user 100. First responding emergency personnel 201 will use the scanner 200 to scan the area/facility designated as an emergency or disaster area. The scanner 200 searches for the beacon/signal initiated by the user's cellular or mobile telephone 100 when the emergency button is triggered (step 101), initiating a broadcasted emergency signal (step 104). The broadcasting emergency signal is transmitted using a Bluetooth protocol, a Wi-Fi protocol, and/or a cellular signal with the encoded naming (step 102), the first responder or search and rescue scanner 200 will scan and determine a location of the beacon signal (step 202) and decode the user's ID of the victim (step 202) owning the cellular or mobile telephone 100 to able to identify the person even before the rescue team rescues the victim. The process also can aid in identifying the missing person's whereabouts where the rescue team can pinpoint the missing person's location to rescue the missing person (step 203). The direction and locating of the mobile signal can use triangulation to find the exact location. The operation of the beacon (step 103) can include a high frequency sound generate by the cellular or mobile telephone 100 and would be emitted from the cellular or mobile telephone 100 in addition to the Bluetooth signal, the Wi-Fi signal and/or the cellular signal. The high frequency sound generated by the cellular or mobile telephone 100 would be heard by sensitive rescue dogs and received by the scanning unit 200 from a long range.

Figure 3:
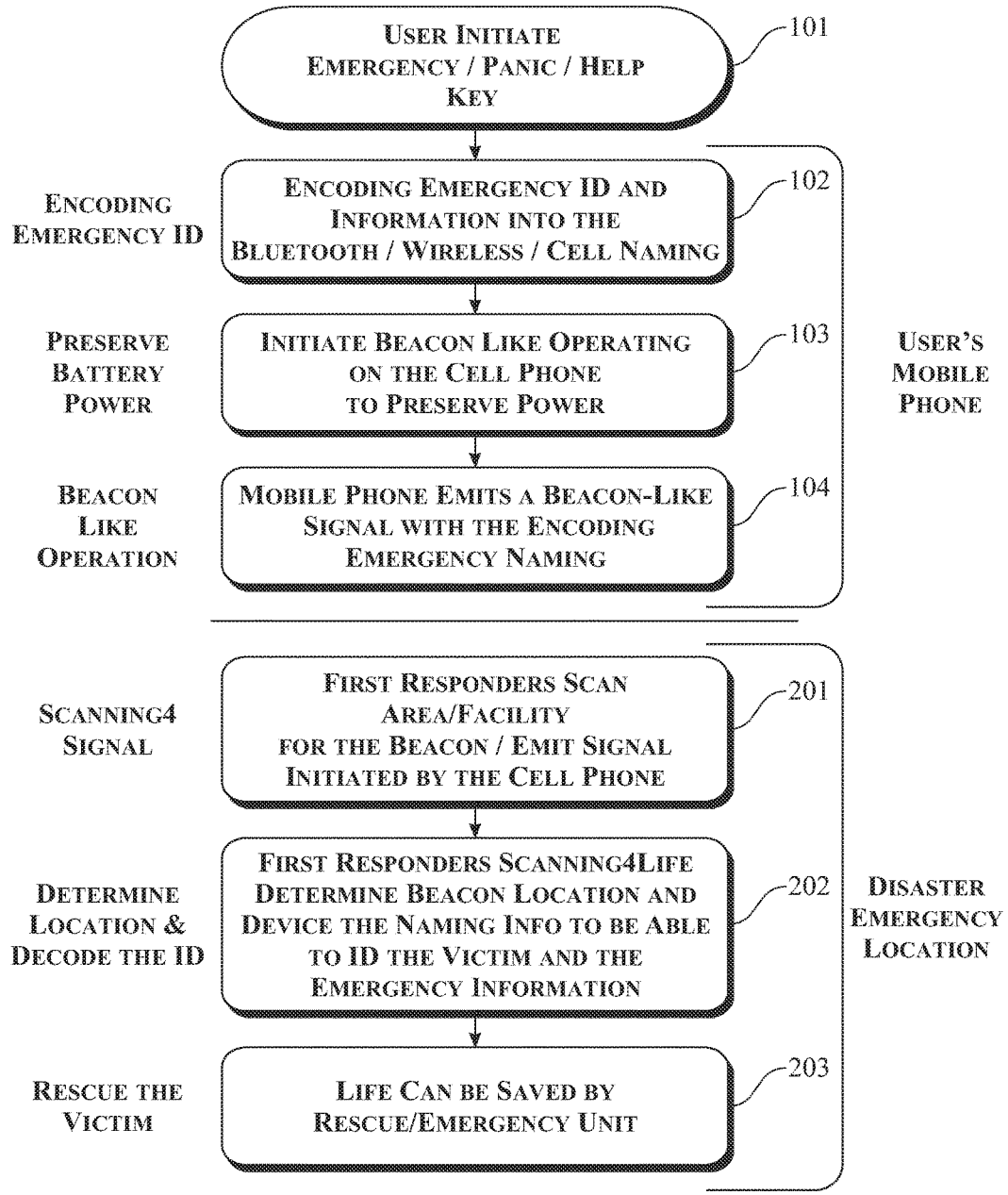
FIG. 3 presents a flow diagram illustrating steps of an exemplary complete method of deployment and use of the procedure.

Turning to FIG. 3, the illustration presents a flow diagram representing a complete scanning4life or emergency scanning and locating procedure as described in FIG. 1 and FIG. 2.

The scanning4life procedure flow diagram describes all the steps of the user emergency application at the user cellular or mobile telephone 100. The process begins with the initiate process where the user actuates an emergency/panic/help key (step 101). Once initiated, the process encodes emergency ID in the cellular or mobile telephone 100. The encoded emergency ID is included in a naming portion of the signal to be broadcasted via the Bluetooth signal, the Wi-Fi signal, or the cellular signal when the cellular or mobile telephone 100 is placed into the beacon mode (step 103). To preserve the power stored within the battery of the cellular or mobile telephone 100, the cellular or mobile telephone 100 will broadcast the signal with the encoding emergency ID (step 104). This will allow the search and rescue or emergency unit to perform scanning in the disaster/emergency area for the beacon signal initiate by the user (step 201). Upon detecting such a signal, the Bluetooth signal, the Wi-Fi signal, and/or the cellular signal emitted from the cellular or mobile telephone 100 when in the beacon mode. The first responder or emergency personnel (step 202) will determine the location of the beacon/mobile 100 and decode the user's emergency information (provided in step 102) using the decoding scanner (step 202). Once the signal is received and decoded, the user of the cellular or mobile telephone 100 can be rescued (step 203).

Figure 4:
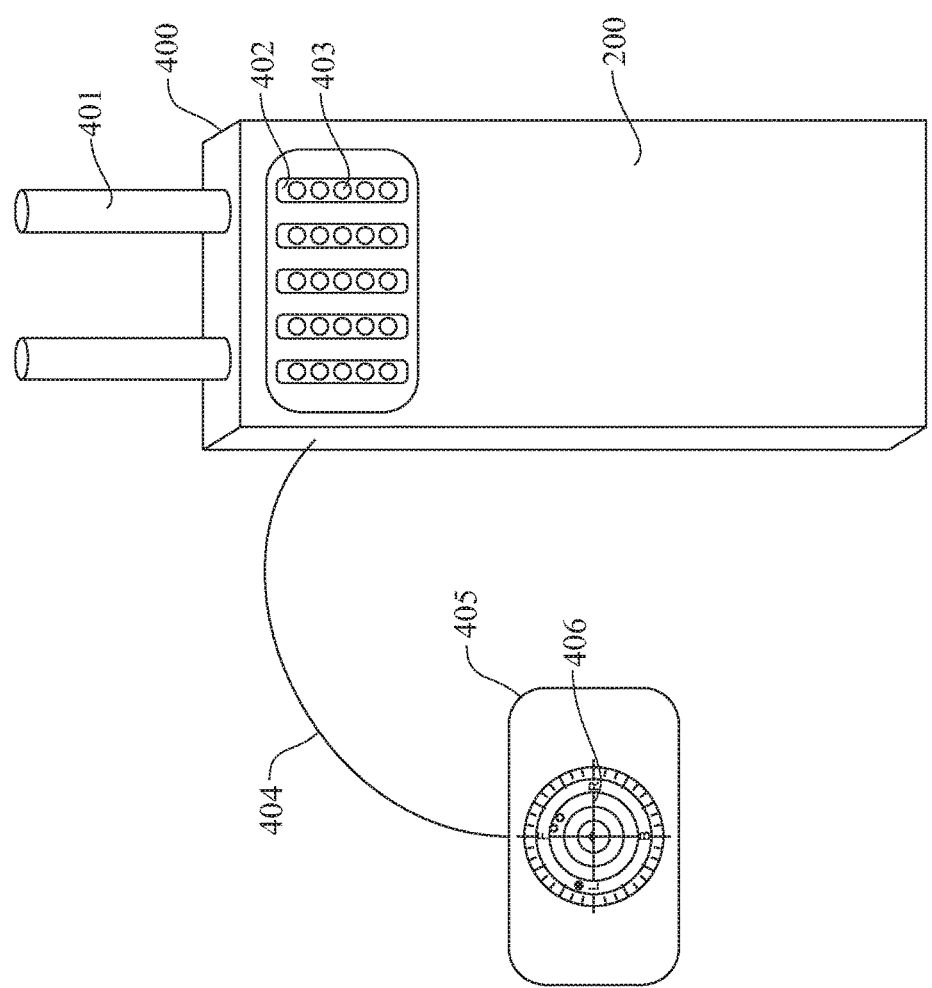
FIG. 4 presents an isometric view of an exemplary scanner for use in an emergency scenario in accordance with the present invention.

Referring to FIG. 4, the illustration presents the scanner 400 used for the scanning4life scanning process. More particularly, the scanner 400 is used to scan an area designated as the emergency or disaster area, search for the emitted signal broadcasted from the cellular or mobile telephone 100 in the beacon mode. The scanner 400, contains a sensitive scanning unit that allow scanning of the cellular signal 2G and 3G cell phone signal emitted from the cellular or mobile telephone 100, as well as scanning for any emitted Wi-Fi beacon signal and any emitted Bluetooth beacon signal. The seeking detection can use a scanning band of 900 Mhz-5.8 GHz, GSM, AMPS, PHS, PCS, WCDMA (European), CDMA (USA), 50 Mhz-6 GHz, with a detection distance of up to 100 M. The scanning unit includes high quality sensitive antennas 401 and can possibly include a Global Positioning System (GPS) for direction finder when finding and locating the signal. The scanning4life device (including the scanner 400 and the associated application) 200 can include a built-in, rechargeable battery with an option to connect to externally provided A/C or D/C power. The scanner 400 can include a Liquid Crystal Display (LCD) to show the signal in a bar like graphics 402 with 10 segments, each for accurate location of the RF sources. Each graph 402 represents a signal source like Bluetooth, Wi-Fi, GSM, etc. Scanned and decoded data 403 would be shown on the screen 402 or on the external computer or screen 405, with a circle 406 that shows the detected devices around the area. The scanning device 400 can have a portable, hand held format or be provided in a portable case. The scanning 200 can be done from a car, by a person, or even from the air using a helicopter or unmanned drone. The scanner 400 can also be used to detect high frequency sound generate by the emergency application operating on the cellular or mobile telephone 100, wherein the high frequency sound is primarily designed to attract rescue dogs or be detected by the scanning unit 400. The scanning unit 400 can also use the external screen 405 or computer unit connected 404 to the scanning unit 400 as an output display. The output can include a location of the signal representing a location of the cellular or mobile telephone 100 operating as a beacon that initiates an emergency signal. The location of the cellular or mobile telephone 100 can be shown in a practical way, such as on the circle. The output can include additional information obtained from the beacon signal emitted from the cellular or mobile telephone 100. People who don't have the emergency application and/or didn't initiate the beacon signal most likely will not be found by the disclosed method. Most likely, the cellular or mobile telephone 100 will not hold the battery charge and/or the beacon signal will not be emitted. The disclosed process also solves any privacy issue, as only people that initiate and press the emergency key will have a chance to being located by the cellular or mobile telephone 100 they carry.

Figure 5:
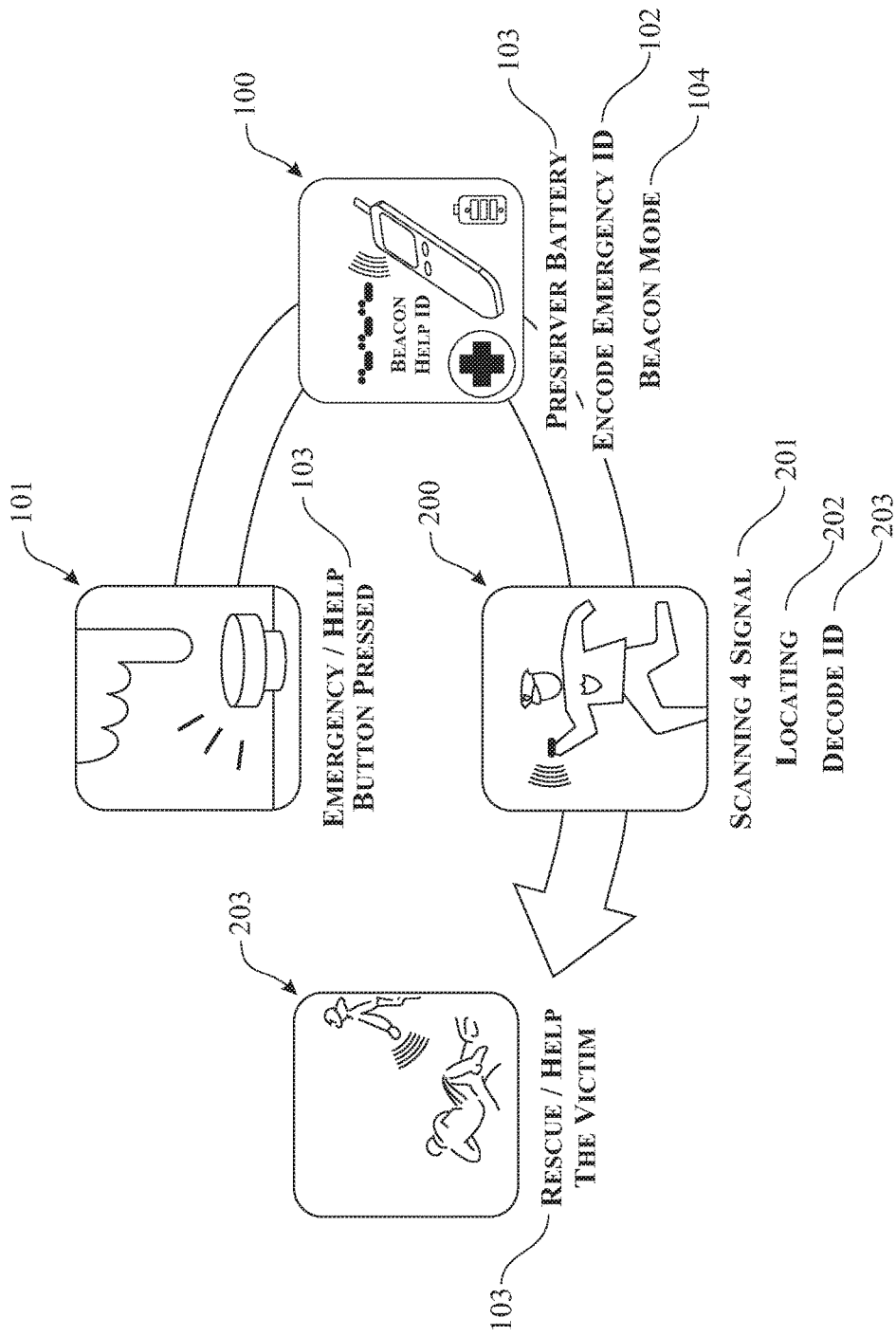
FIG. 5 presents a schematic diagram introducing an exemplary process flow between various elements of the overall emergency system.

Referring to drawing FIG. 5, the illustration presents a schematic diagram representative of how scanning4life or emergency scanning and locating works. To initiate the process, an emergency/help button was press (step 101) by the user that will initiate procedure (step 100). Procedure 100 includes steps of preserving the battery (step 103) by entering into beacon mode (step 104) and encoding an emergency ID and other associated emergency information into the broadcast signal (step 102). The search and rescue or the emergency personnel will scan the area (using the scanner 200) for signals and sound emitted from the cellular or mobile telephone 100, using the scanning4life scanner (step 201), that locates (step 202) and decodes the user's ID and emergency information to aid in rescuing/helping the victim (step 203).

Figure 6:
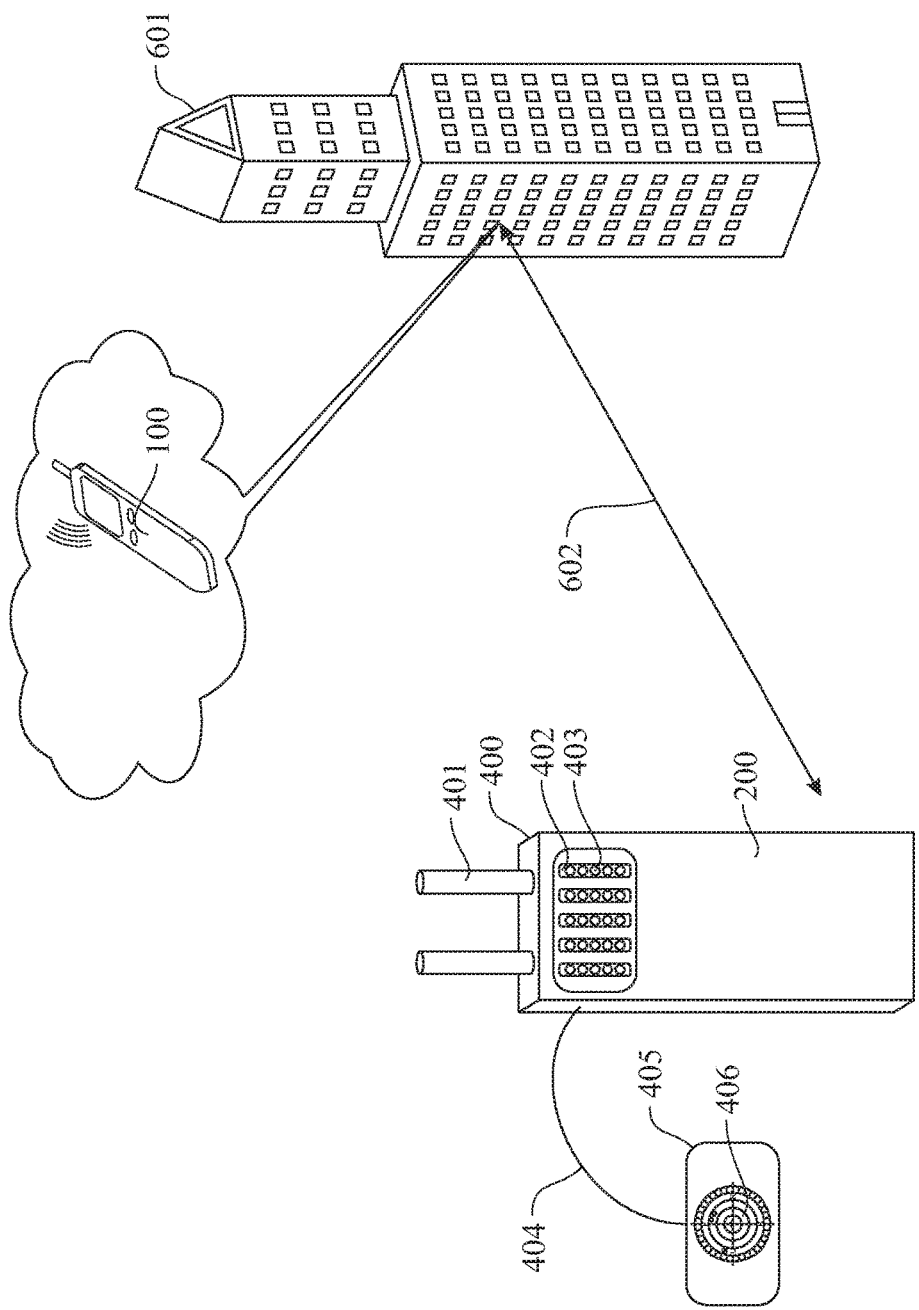
FIG. 6 presents a schematic diagram representing one exemplary use of the emergency locating method to detect and locate people that might need help in an emergency condition.

Turning to FIG. 6, the illustration presents a use of the disclosed method in searching for a user initiate an emergency/help/panic button within a building 601 even from outside of the building. In an emergency situation the cellular or mobile telephone 100 would emit an emergency beacon (step 104), which would be scanned (step 201) from outside by the scanner 200 with the screen 402. The scanned and decoded data 403 would be shown on the screen 402 or on the external computer or screen 405, with a circle 406 that shows the detected devices around the area.

The above-described embodiments are merely exemplary illustrations of implementations set forth for a clear understanding of the principles of the invention. Many variations, combinations, modifications or equivalents may be substituted for elements thereof without departing from the scope of the invention. Therefore, it is intended that the invention not be limited to the particular embodiments disclosed as the best mode contemplated for carrying out this invention, but that the invention will include all the embodiments falling within the scope of the appended claims.

What is claimed is:

1. A method for providing a third party with medical information associated with a user, the method comprising steps of:
  obtaining a user's cellular telephone, the cellular telephone including a microprocessor, a non-transient memory device in signal communication with the microprocessor, and a data entry device, the user's cellular telephone containing an emergency/non-emergency events application stored in the non-transient memory device;

providing medical information to the user's cellular telephone;

encoding the medical information using the emergency/non-emergency events application, the emergency/non-emergency events application running using the microprocessor;

storing the encoded medical information in the non-transient memory device;

providing the user's medical information to a third party using the emergency/non-emergency events application.

2. A method for providing a third party with medical information associated with a user as recited in claim 1, the method further comprising a step of providing guidance for proactive treatment of the user of the respective user's cellular telephone.

3. A method for providing a third party with medical information associated with a user as recited in claim 1, wherein the medical information is provided to at least one of:
- an E-911 service,
- a medical provider,
- provide medical help, and
- a first responder.

4. A method for providing a third party with medical information associated with a user as recited in claim 1, the method further comprising a step of:
- decoding the encoded medical information to provide assistance when the user needs medical help.

5. A method for providing a third party with medical information associated with a user as recited in claim 1, the method further comprising steps of:
- transmitting a beacon signal from the user's cellular telephone, wherein the beacon signal includes the encoded medical information.

6. A method for providing a third party with medical information associated with a user as recited in claim 5, wherein the beacon signal is being transmitted using at least one of a Bluetooth protocol and a Wi-Fi protocol.

7. A method for providing a third party with medical information associated with a user as recited in claim 5, further comprising a step of:
- embedding the medical information within an identification portion of the beacon signal,
- wherein the beacon signal is being transmitted using at least one of a Bluetooth protocol and a Wi-Fi protocol.

8. A method for providing a third party with medical information associated with a user as recited in claim 2, wherein the medical information is utilized by at least one of:
- an emergency based Application operating on the user's cellular telephone,
- a non-emergency based Application operating on the user's cellular telephone, and
- an application conveying medical information, the application operating on the user's cellular telephone,
- the method further comprising steps of:
- activating one of the emergency based Application the non-emergency based Application, or the application conveying medical information,
  - wherein the activated Application initiates the beacon signal; and
  - embedding the medical information within an identification portion of the beacon signal,
  - wherein the beacon signal is being transmitted using at least one of a Bluetooth protocol and a Wi-Fi protocol.

9. A method for providing a third party with medical information associated with a user as recited in claim 8, wherein the activated Application further comprises a step of assisting at least one first responder in locating the user.

10. A method for providing a third party with medical information associated with a user as recited in claim 8, wherein the activated Application further comprises a step of assisting the user in need of medical help.

11. A method for providing a third party with medical information associated with a user as recited in claim 1, wherein the medical information includes a blood type of the user.

12. A method for providing a third party with medical information associated with a user as recited in claim 1, wherein the medical information is utilized by at least one of:
- an emergency based application operating on the user's cellular telephone,
- a non-emergency based application operating on the user's cellular telephone, and
- an application conveying medical information, the application operating on the user's cellular telephone.

13. A method for providing a third party with medical information associated with a user as recited in claim 1, wherein access to the medical information is prescribed by settings established by the user.

14. A method for providing a third party with medical information associated with a user, the method comprising steps of:
- obtaining a user's cellular telephone, the cellular telephone including a microprocessor, a non-transient memory device in signal communication with the microprocessor, and a data entry device, the user's cellular telephone containing an emergency/non-emergency events application stored in the non-transient memory device;
- providing a user's identification to the user's cellular telephone;
- providing medical information to the user's cellular telephone;
- encoding the user's identification and the user's medical information using the emergency/non-emergency events application, the emergency/non-emergency events application running using the microprocessor to create a user's profile;
- storing the encoded user's profile in the non-transient memory device;
- providing the user's profile to a third party using the emergency/non-emergency events application.

15. A method for providing a third party with medical information associated with a user as recited in claim 14, the method further comprising a step of providing guidance for proactive treatment of the user of the respective user's cellular telephone.

16. A method for providing a third party with medical information associated with a user as recited in claim 14, wherein the user's profile is provided to at least one of:
- an E-911 service,
- a medical provider,
- provide medical help, and
- a first responder.

17. A method for providing a third party with medical information associated with a user as recited in claim 14, the method further comprising a step of:
- decoding the encoded user's profile to provide assistance when the user needs medical help.

18. A method for providing a third party with medical information associated with a user as recited in claim 14, the method further comprising steps of:
transmitting a beacon signal from the user's cellular telephone, wherein the beacon signal includes the encoded user's profile.

19. A method for providing a third party with medical information associated with a user as recited in claim 18, wherein the beacon signal is being transmitted using at least one of a Bluetooth protocol and a Wi-Fi protocol.

20. A method for providing a third party with medical information associated with a user as recited in claim 18, further comprising a step of:
embedding the user's profile within an identification portion of the beacon signal,
wherein the beacon signal is being transmitted using at least one of a Bluetooth protocol and a Wi-Fi protocol.

21. A method for providing a third party with medical information associated with a user as recited in claim 15, wherein the user's profile is utilized by at least one of:
an emergency based Application operating on the user's cellular telephone,
a non-emergency based Application operating on the user's cellular telephone, and
an application conveying user's profile, the application operating on the user's cellular telephone,
the method further comprising steps of:
activating one of the emergency based Application the non-emergency based Application, or the application conveying user's profile,
wherein the activated Application initiates the beacon signal; and
embedding the user's profile within an identification portion of the beacon signal,
wherein the beacon signal is being transmitted using at least one of a Bluetooth protocol and a Wi-Fi protocol.

22. A method for providing a third party with medical information associated with a user as recited in claim 21, wherein the activated Application further comprises a step of assisting at least one first responder in locating the user.

23. A method for providing a third party with medical information associated with a user as recited in claim 21, wherein the activated Application further comprises a step of assisting the user in need of medical help.

24. A method for providing a third party with medical information associated with a user as recited in claim 14, wherein the medical information includes a blood type of the user.

25. A method for providing a third party with medical information associated with a user as recited in claim 14, wherein the user's profile is utilized by at least one of:
an emergency based application operating on the user's cellular telephone,
a non-emergency based application operating on the user's cellular telephone, and
an application conveying medical information, the application operating on the user's cellular telephone.

26. A method for providing a third party with medical information associated with a user as recited in claim 14, wherein access to the user's profile is prescribed by settings established by the user.

\* \* \* \* \*